(12) United States Patent
Amaral

(10) Patent No.: US 7,856,971 B2
(45) Date of Patent: Dec. 28, 2010

(54) ELEVATOR FOR HOT PLATES OR GRATES OF BARBECUE GRILLS

(76) Inventor: Joao Urbano Amaral, Rua Tres Irmaos, 36, apto 151, Jd. Guedala, 05615-150, Sao Paulo SP (BR)

( * ) Notice: Subject to any disclaimer, the term of this patent is extended or adjusted under 35 U.S.C. 154(b) by 768 days.

(21) Appl. No.: 11/718,110

(22) PCT Filed: Nov. 1, 2005

(86) PCT No.: PCT/BR2005/000227
§ 371 (c)(1),
(2), (4) Date: Apr. 27, 2007

(87) PCT Pub. No.: WO2006/047844
PCT Pub. Date: May 11, 2006

(65) Prior Publication Data
US 2009/0044796 A1    Feb. 19, 2009

(30) Foreign Application Priority Data
Nov. 3, 2004    (BR) ................................ 8403405 U

(51) Int. Cl.
*A47J 37/00*    (2006.01)
*A47J 37/07*    (2006.01)
*F24B 3/00*    (2006.01)

(52) U.S. Cl. ............. 126/25 A; 126/273 A; 126/273 R; 126/41 E; 312/410

(58) Field of Classification Search ............. 126/337 R, 126/500, 41 E, 25 A, 14, 332, 505, 506, 540, 126/152 B, 25 AA, 25 R, 19 R; 99/390, 391, 99/393, 410; 312/247, 410, 236; 187/266, 187/251, 254, 263, 244; 254/334–338, 387
See application file for complete search history.

(56) References Cited

U.S. PATENT DOCUMENTS

| | | | | |
|---|---|---|---|---|
| 2,213,483 A | * | 9/1940 | Benson | 126/9 R |
| 4,559,840 A | * | 12/1985 | Sasaki | 74/89.21 |
| 4,926,973 A | * | 5/1990 | Smith | 187/240 |
| 5,429,043 A | * | 7/1995 | Becker | 99/448 |
| 6,241,048 B1 | * | 6/2001 | Heilmann | 187/263 |
| 6,845,705 B1 | * | 1/2005 | Chen | 99/340 |
| 7,069,924 B2 | * | 7/2006 | Kuttalek et al. | 126/273 R |
| 7,341,054 B2 | * | 3/2008 | Kuttalek | 126/19 M |
| 2005/0028803 A1 | * | 2/2005 | Jiang | 126/25 A |

FOREIGN PATENT DOCUMENTS

| DE | 19643748 A | 4/1998 |
|---|---|---|
| FR | 2513744 A | 4/1983 |
| FR | 2766695 A1 | 2/1999 |

OTHER PUBLICATIONS

International Search Report.

* cited by examiner

*Primary Examiner*—Kenneth B Rinehart
*Assistant Examiner*—Daniel A Bernstein
(74) *Attorney, Agent, or Firm*—William J. Sapone; Coleman Sudol Sapone P.C.

(57) ABSTRACT

The object of the present patent is an elevator for hot plates or grates of barbecue grills, having gutters (1), (2) and (3) assembled in a "U" shape, the gutter (5), in its ends the plates (6) with rollers (8), the gutters (10), (11) and (12), also assembled the shape of a "U", constituting the support for the hot plate or grate and with the mortises (13) embracing the gutter (5), which slides vertically through the grooves (4) of gutters (1) and (3), taken by the cable (18), which passes through the groove of the pivot (7) of one of the plates (6) and is fixed there by the fixers (19), being the cable mobile in a circuit between the pulleys (16) and (17), by the action of the crank (14), fixed to the axle (15), the pulley (16) and the pivot (20), after its release from the part (21), but coming back due to the work of the spring (22), when the hot plate or the grater is the desired position and, in order to keep the hot plate or the grate in a horizontal position, there are the cables (24) and (25) departing from the closing plates (9) of the gutters (1) and (3), passing on the double pulleys (26), crossing one another inside gutter (5) and ending in the tensioners (27) and (28).

1 Claim, 4 Drawing Sheets

ELEVATOR FOR HOT PLATES OR GRATES OF BARBECUE GRILLS

FIELD OF APPLICATION

The present patent relates to a fitting for barbecue grills. Such fitting could be used in household fixed barbecue grills, or barbecue grills present in bars, steak houses, country clubs and the like. We should consider fixed barbecue grills the ones made of bricks, concrete or metal. The objective of the present patent is to improve the grills in respect to their use and efficiency.

BACKGROUND AND PRIOR ART

In the existing fixed barbecue grills, the hot plate or grate, on which the meat, other ingredients or spits are placed, remain always static, meaning they do not move in any direction.

This immobility brings the downside of the burning of the meat and the ingredients, even with all possible care of the user.

Another downside that results from this immobility is the difficulty of adding the charcoal, spreading the charcoal in order to increase its incandescence and cleaning the grill. Also, in the case of gas barbecue grills, there is the same difficulty in dealing with the burners, be it for regulating them, fixing them or cleaning them.

In view of all these downsides and with the objective of solving them, a device was developed for barbecue grills, which is the object of the present patent. This device consists of an elevator that enables to move the hot plate or the grate upwards and downwards. This elevator consists of metal gutters, plates, axles, pulleys, rollers, tensioners, springs, pivots, clogs and flexible cables, which are all set in motion by a crank.

Therefore, this device enables moving and stationing the hot plate or grate on several heights and distances from the burning charcoal.

BRIEF DESCRIPTION OF THE DRAWINGS

The figures attached hereto show the details of all the ensemble, which is the object of the present patent, on which.

DETAILED DESCRIPTION OF PREFERRED EMBODIMENTS

Figure 1:
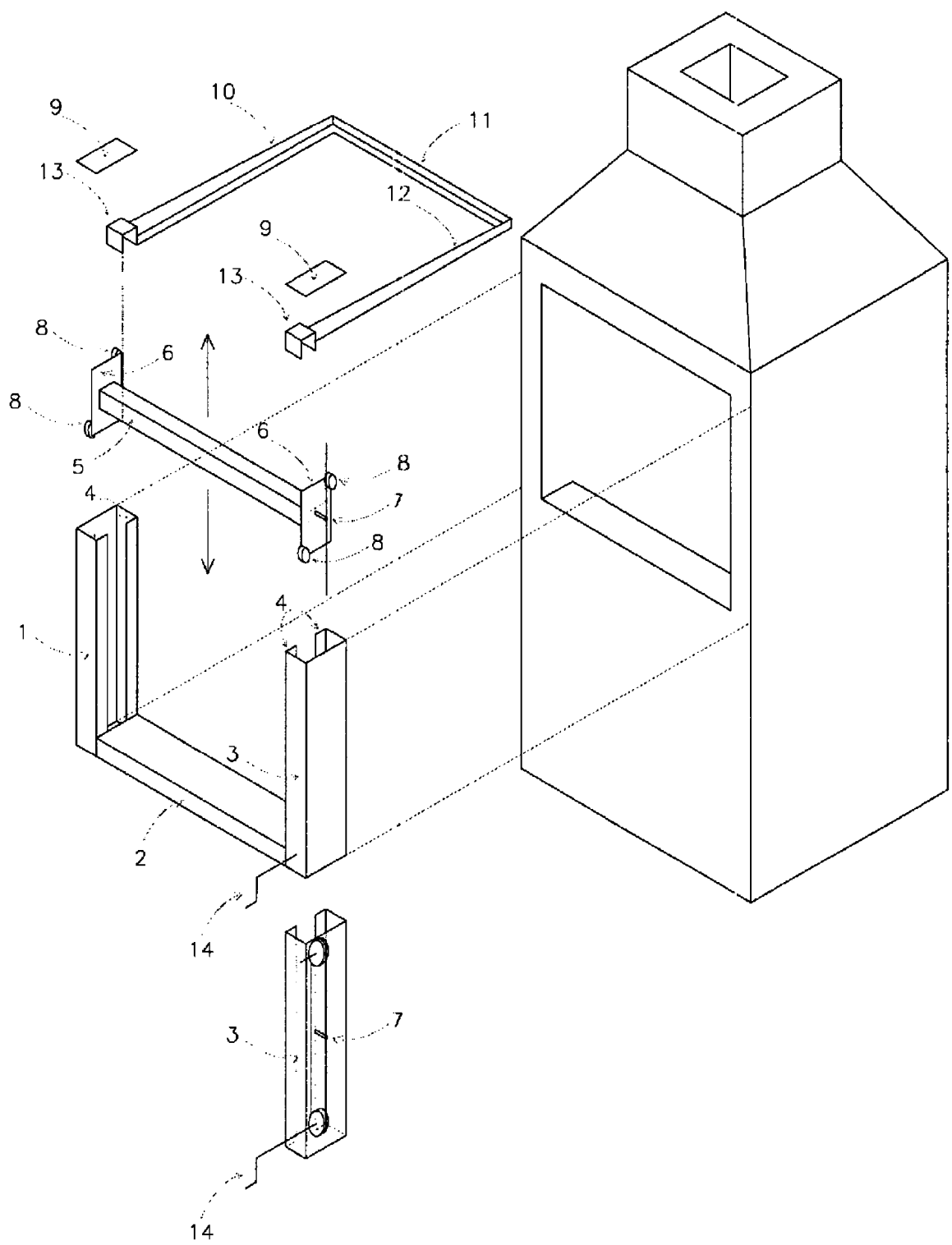
FIG. 1 shows a perspective view of the object of the present patent.

According to what is shown by the afore mentioned figures, the elevator of hot plates or grates, which is the object of the present patent, consists firstly of and ensemble in a "U" form (FIG. 1), resulting from the mounting of the three gutters (1), (2) and (3). The gutters (1) and (2) have inner grooves (4).

A second ensemble is formed by the gutter (5), by the two plates (6) fixed on its ends and by the rollers (8). In one of the plates (6) there is a pivot (7) in a 90° position in relation to the groove.

There is also a third ensemble, also "U" shaped, resulting from the mounting of the parts (10), (11) and (12), having the mortises (13) present on the free ends of the parts (10) and (12). This ensemble, always in the horizontal position, is the one that enters the barbecue grill and serves as support to the hot plate or grate.

The union of these ensembles is done initially by the fitting in of the mortises (13) on the gutter (5), resulting in all the portion that will move vertically.

The ends of the gutter (5) move through the grooves (4) and there the plates (6) are fixed, which will work in the interior of the gutters (1) and (3). The positions of the rollers (8) are meant to support the momentum applied to the gutter (5), which is caused by the weight of the third ensemble.

Figure 3:
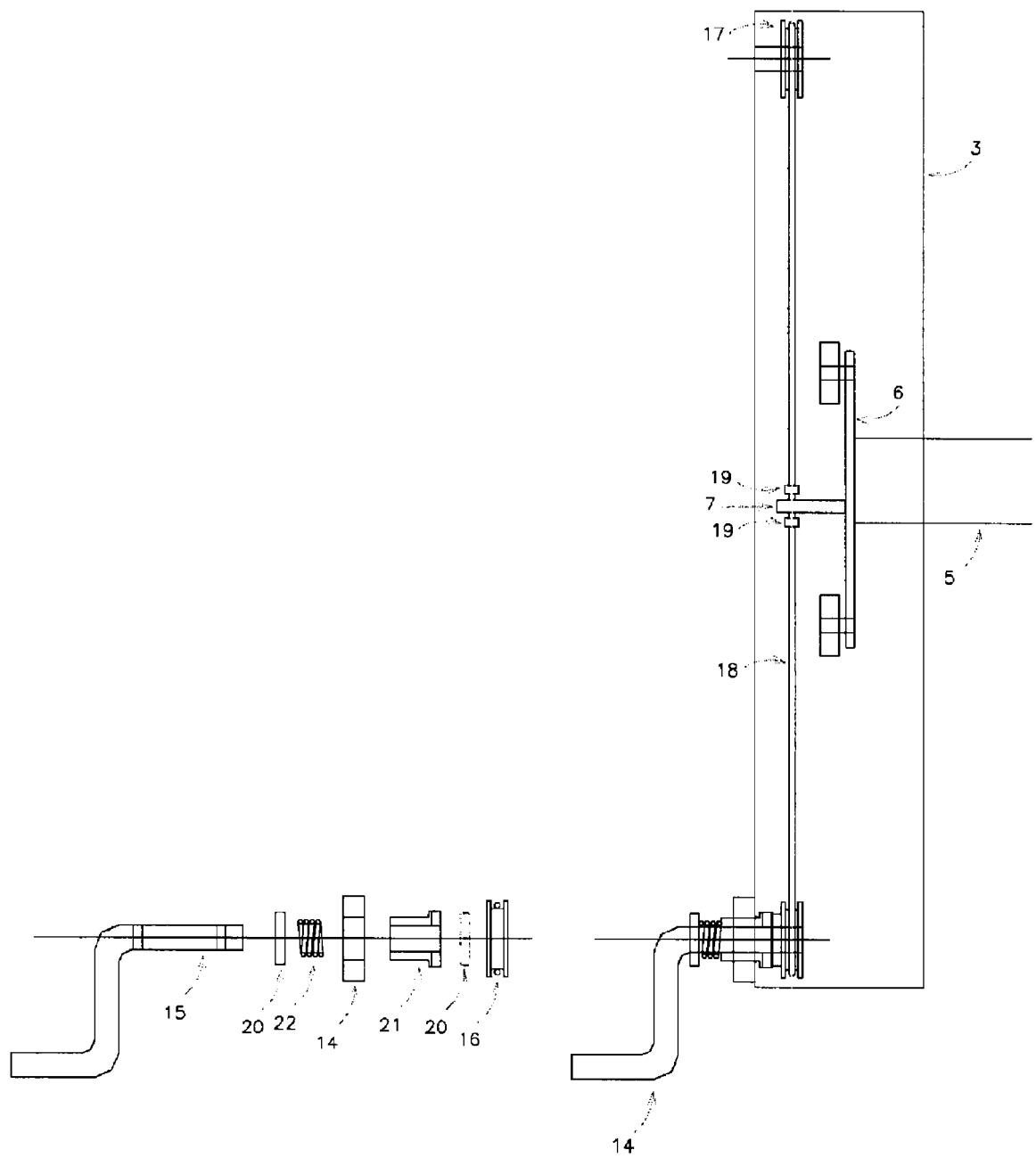
FIG. 3 shows the device that will lift, keep in place or lower the hot plate or grate of the barbecue grill.

The pivot (7) of 90° in relation to the groove, is placed on the plate (6), the one that is on the side where the device that will enable the elevation is situated (FIG. 3), since this device could be installed in the gutter (3) or (1).

One of the arms of the cable (18) passes through the groove of the pivot (7), which makes the circuit between the pulleys (16) and (17).

Therefore, the cable (18), when set in motion and to which the pivot (7) is fixed by the fixers (19), drags upwards and downwards the gutter (5) along with everything that is attached to it.

Before initiating the turn of the crank (14), which is fixed to the axle (15), the pulley (16) and the pivot (20), the user must push it forward to release the pivot (20) that is incased in the part (21), which is fixed to the gutter.

Once the hot plate or the grate is in the desired position, the ensemble will be restrained again by the action of the spring (22) forcing the pivot (20) in its incasing in the part (21).

Figure 4:
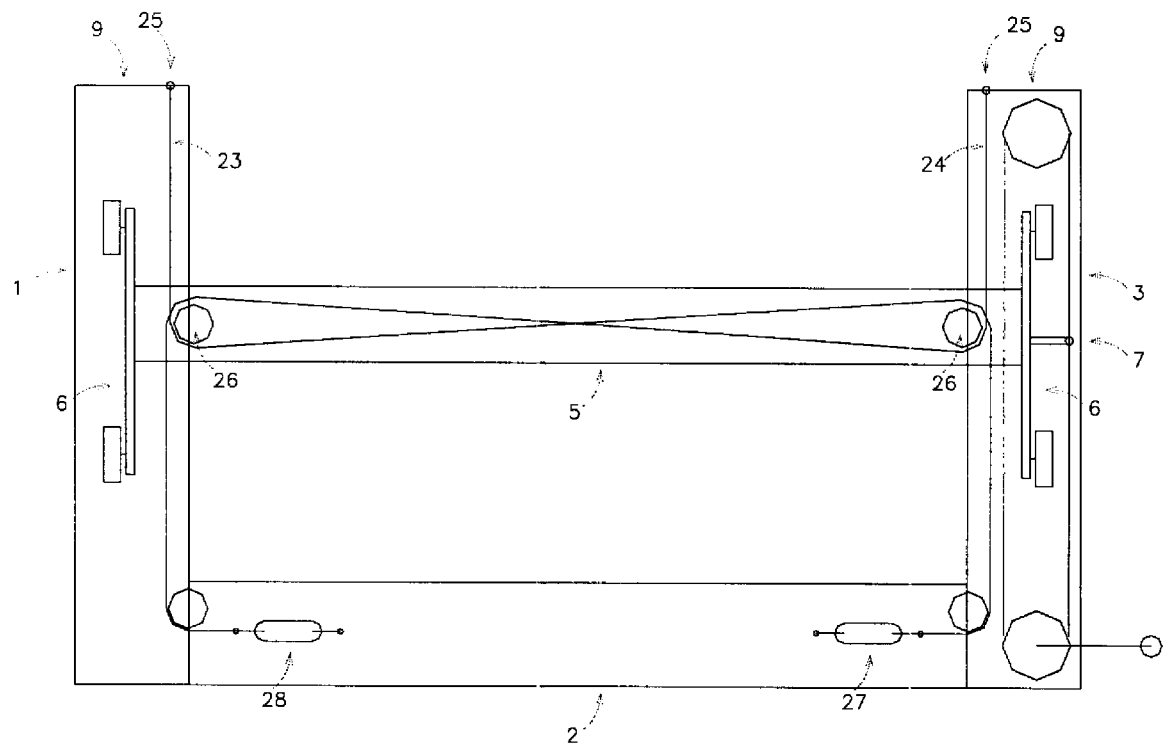
FIG. 4 shows the device that will enable the gutter (5), on which lays the ensemble of the parts (10), (11) and (12). These parts are the support of the hot plate or grate when it is lifted or lowered, so in can always remain stable in a horizontal position.

Finally, in order to enable all the moving ensemble to go up and down always stabilized in a horizontal position, there is a device (FIG. 4), which consists of flexible cables (23) and (24), being the cable (23) part of the hook (25) that is fixed to the closing plate (9) of the gutter (1), going down the interior of the last, entering the gutter (5), passing on the two double pulleys (26) that are fixed to the gutter (5), going down the inside of the gutter (3) and finishing on the tensioner (27) situated in the inner side of the gutter (2). In the same way, the cable (24), which is part of the hook (25) and is fixed to the closing plate (9) of the gutter (3), goes down the inner part of the later, enters the gutter (5), passes on the two double pulleys (26), crosses the cable (23) in "X", goes down the inner portion of the gutter (1) and finishes on the tensioner (28), situated inside the gutter (2).

Figure 2:
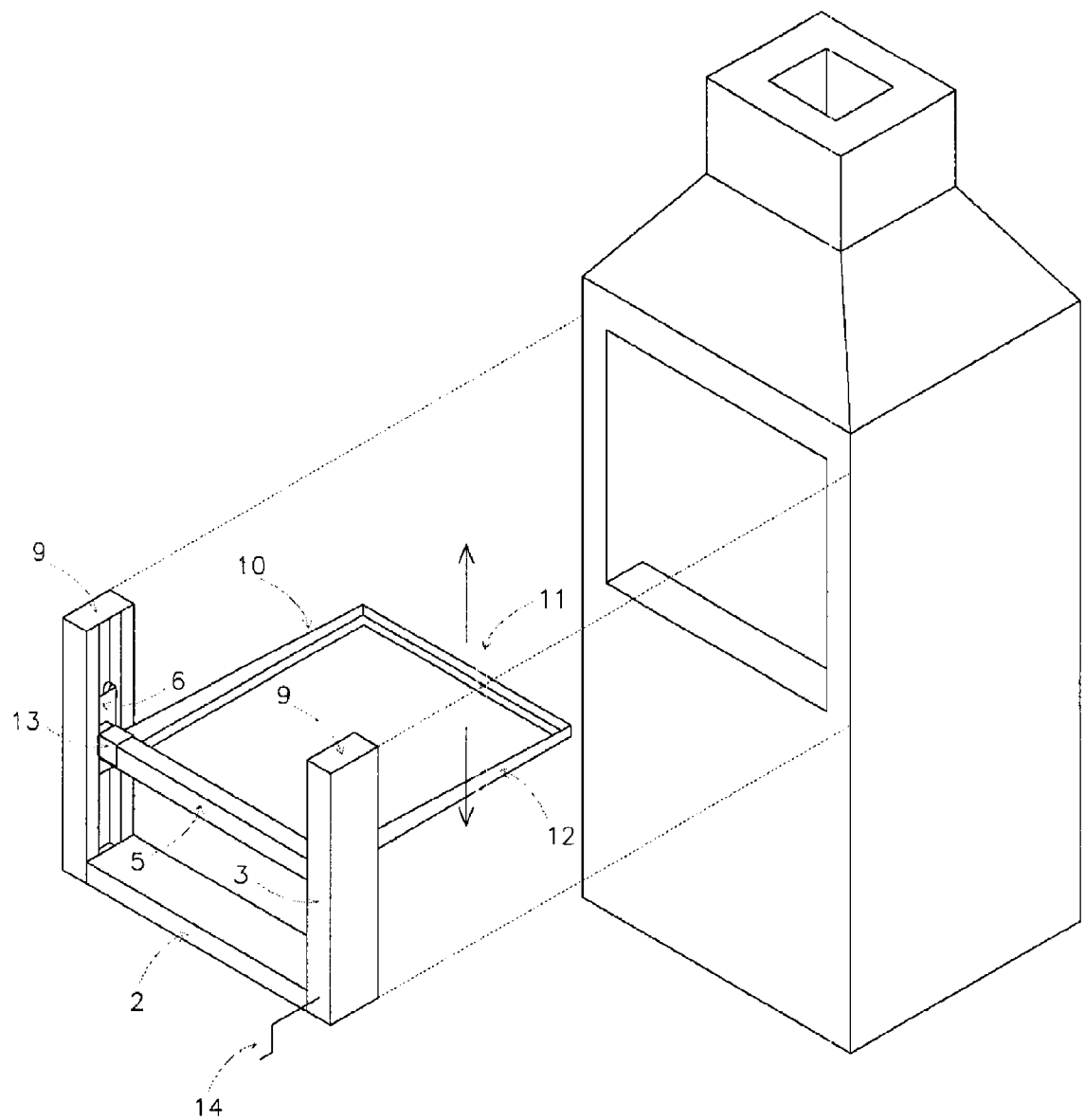
FIG. 2 shows the object of the present patent duly mounted on the barbecue grill.

The elevator, resulting from all this ensemble, is fixed externally, even with the opening of the barbecue grill (FIG. 2).

The invention claimed is:

1. An elevator for raising and lowering a hot plate or grate located in a barbeque grill comprising:
    a first ensemble comprised of a first gutter, a second gutter and a third gutter assembled in the form of an upright "U", the first gutter and the third gutter, being upright and each having inner grooves which face each other;
    a second ensemble comprised of a fourth gutter (5) which is horizontal and which has a pair of plates located on opposite ends thereof, each plate having a pair of rollers (8), the plates and rollers received within the facing inner grooves of the first ensemble;
    a third ensemble composed of fifth, sixth and seventh gutters assembled in the form of a horizontal "U", the third ensemble supporting the hot plate or grate and having mortised ends which engage the fourth gutter (5), fixing the third ensemble thereto, the third ensemble being slidable upwardly and downwardly, guided by the plates located within the inner grooves of the first ensemble, enabling the hot plate or grate supported thereon to be moved closer to or more distant from a source of heat for the barbeque grill, one plate of the fourth gutter having a pivot with a groove which engages a cable which forms a closed loop between a first pulley and a second pulley, the cable being fixed to the pivot by a fixer, such that moving the cable moves the fourth gutter (5) upwardly and downwardly, as the rollers (8) slide along inner walls of the inner grooves, the first pulley being rotatable on an axle which is connected to a crank through a locking part and a crank pivot, being biased into engagement with each other by a spring, such that a user must push forward to free the crank pivot from the locking part to permit rotation thereof along with the first pulley, and, once the hot plate or grate is in a desired position, the first pulley is locked in place by the spring (22) which forces the crank pivot (20) back to a locking position engaged to the locking part (21) and, a leveling device for moving the third ensemble in a stabilized horizontal position comprised of a pair of flexible cables, a first cable having an end fixed to a top of the first gutter, and a second cable having an end fixed to a top of the third gutter, the fourth gutter having a first set of double pulleys mounted adjacent the first gutter and a second set of double pulleys mounted adjacent the third gutter, the first cable and the second cable passing down from the top and around the first and second sets of double pulleys, each cable crossing over to the opposed respective gutter, such that the first cable enters the inner groove of the third gutter and the second cable enters the inner groove of the first gutter, the first cable passing down the interior of the third gutter and having an end thereof fixed to a first tensioner (27) situated within the second gutter (2), and the second cable passing down the interior of the first gutter and having an end thereof fixed to a second tensioner situated within the second gutter.

\* \* \* \* \*